US008880007B1

(12) United States Patent
Mansour et al.

(10) Patent No.: US 8,880,007 B1
(45) Date of Patent: Nov. 4, 2014

(54) REDUCING WIRELESS COMMUNICATION LATENCY

(75) Inventors: Nagi A. Mansour, Arlington, VA (US); Kafi I. Hassan, Fairfax, VA (US); Nawara Omary, Vienna, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 294 days.

(21) Appl. No.: 13/551,391

(22) Filed: Jul. 17, 2012

(51) Int. Cl.
*H04B 1/44* (2006.01)

(52) U.S. Cl.
USPC .......... 455/78; 455/77; 455/550.1; 455/575.7; 333/1.1

(58) Field of Classification Search
USPC ........ 455/77, 78, 82–84, 90.3, 137, 269, 273, 455/550.1, 575.1, 575.7; 333/1.1
See application file for complete search history.

(56) References Cited

U.S. PATENT DOCUMENTS

| 6,842,629 | B1 * | 1/2005 | Granstam et al. | 455/561 |
| 7,373,115 | B2 * | 5/2008 | Monroe | 455/82 |
| 7,816,995 | B1 * | 10/2010 | Allen et al. | 333/1.1 |
| 8,285,217 | B1 * | 10/2012 | Rockway et al. | 455/63.1 |
| 8,463,201 | B2 * | 6/2013 | Jung et al. | 455/78 |

* cited by examiner

*Primary Examiner* — Nhan Le

(57) ABSTRACT

In systems and methods of reducing latency in a wireless communication system, a first signal of a first radio access technology and a second signal of a second radio access technology are received at a first antenna and a second antenna of a wireless device. From a first circulator the first signal received at the first antenna and the second antenna are received and combined to generate a combined first signal. In addition, from a second circulator the second signal received at the first antenna and the second antenna are received and combined to generate a combined second signal. While receiving the first signal of the first radio access technology, a call request is received over the second signal of the second radio access technology.

20 Claims, 5 Drawing Sheets

REDUCING WIRELESS COMMUNICATION LATENCY

TECHNICAL BACKGROUND

Wireless communication devices can communicate with communication networks to obtain a variety of services, including interconnect communication, short message service, packet data communications and dispatch communications. Interconnect communication typically involves full duplex or "two-way" communication. Dispatch services are typically half-duplex or "one-way" communication, and are frequently implemented as a push-to-talk (PTT) type of service. In interconnect communication systems performance requirements can tolerate call setup periods of several seconds. For push-to-talk communication systems performance requirements require substantially shorter call setup periods.

OVERVIEW

In an embodiment, a first signal of a first radio access technology is received at a first antenna and a second antenna of a wireless device. The first antenna is in communication with a first circulator and the second antenna is in communication with a second circulator. A second signal of a second radio access technology is received at the first antenna and the second antenna of the wireless device while receiving the first signal. The first signal received at the first antenna and the first signal received at the second antenna are combined to generate a combined first signal, and the second signal received at the first antenna and the second signal received at the second antenna are combined to generate a combined second signal. While receiving the first signal of the first radio access technology, a call request is received over the second signal of the second radio access technology.

DETAILED DESCRIPTION

In an embodiment, a wireless device comprises a first antenna in communication with a first circulator and a second antenna in communication with a second circulator. A first signal of a first radio access technology is received at the first antenna and the second antenna of the wireless device, and a second signal of a second radio access technology is received at the first antenna and the second antenna of the wireless device while receiving the first signal. From the first circulator and the second circulator, the first signal received at the first antenna and the first signal received at the second antenna are combined to generate a combined first signal. In addition, the second signal received at the first antenna and the second signal received at the second antenna are combined to generate a combined second signal. While receiving the first signal of the first radio access technology, a call request is received over the second signal of the second radio access technology. In an embodiment, a communication session is conducted using the first radio access technology the second radio access technology is monitored for a push-to-talk call request during the communication session.

Figure 1:
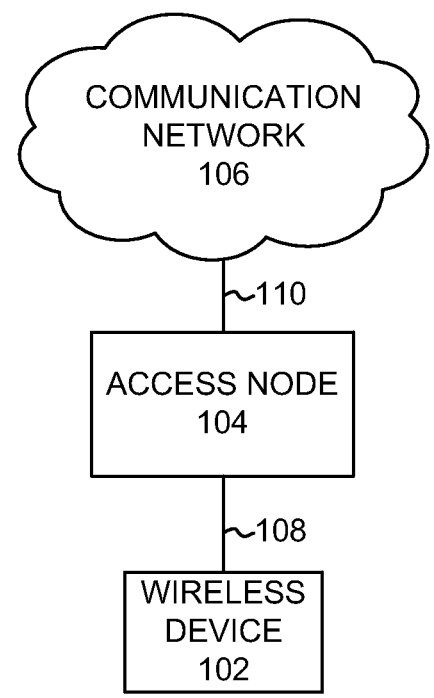
FIG. 1 illustrates an exemplary communication system to reduce latency in a wireless communication system.

FIG. 1 illustrates an exemplary communication system 100 to process a call request comprising wireless device 102, access node 104, and communication network 106. Examples of wireless device 102 can include a cell phone, a smart phone, a computing platform such as a laptop, palmtop, or tablet, a personal digital assistant, or an internet access device, including combinations thereof. Wireless device 102 is in communication with access node 104 through communication link 108.

Access node 104 is a network node capable of providing wireless communications to wireless device 102, and can be, for example, a base transceiver station, a radio base station, an eNodeB device, or an enhanced eNodeB device. Access node 104 is in communication with communication network 106 through communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 108 and 110 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

Figure 2:
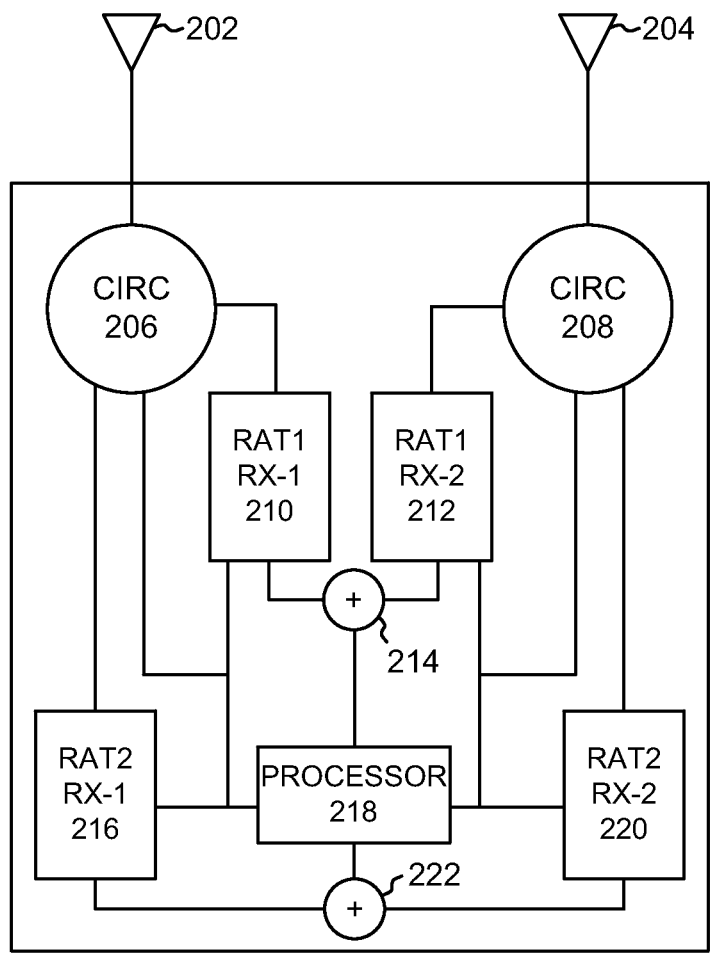
FIG. 2 illustrates an exemplary wireless device.

FIG. 2 illustrates exemplary wireless device 102 usable in a communication system to reduce latency in a wireless communication system. Wireless device 102 comprises antennas 202 and 204, circulators 206 and 208, receivers 210, 212, 216 and 220, summers 214 and 222, and processor 218. Elements 202-222 can communicate through an appropriate communication link, for example, a communication bus or other circuitry. Each of the elements 202-222 can be disposed within a housing, but this is by no means a requirement or limitation. Processor 218 is in communication with and controls the operations of each of the other elements of wireless device 102. Antennas 202 and 204 are capable of receiving both a signal of a first radio access technology and a signal of a second radio access technology. Antennas 202 and 204 are in communication with circulators 206 and 208, respectively.

Circulator 206 is also in communication with receiver 210 for a first radio access technology (RAT1) and receiver 216 for a second radio access technology (RAT2). Circulator 208 is also in communication with receiver 212 for a first radio access technology and receiver 220 for a second radio access technology. Thus, wireless device 102 comprises two receivers 210 and 212 for the first radio access technology and two receivers 216 and 220 for the second radio access technology. Circulators 206 and 208 can operate in cycles during which each circulator can sequentially connect its respectively connected antenna with each of its respectively connected receivers. For example, during a cycle circulator 206 can connect antenna 202 and receiver 210, and then can connect antenna 202 and receiver 216. Similarly, during a cycle circulator 208 can connect antenna 204 and receiver 212, and then can connect antenna 202 and receiver 220.

When antennas 202 and 204 receive signals of a first radio access technology and a second radio access technology, circulators 206 and 208 operate to allow receivers of the wireless device to receive the signal from both the first and second radio access technologies during a single cycle of the circulators. For example, when antenna 202 receives a signal of a first radio access technology and a signal of a second radio access technology, during a single cycle, circulator 206 can connect antenna 202 and receiver 210, enabling receiver 210 to receive the signal of the first radio access technology, and circulator 206 can connect antenna 202 and receiver 216, enabling receiver 216 to receive the signal of the second radio access technology. Circulator 208 is capable of an analogous function with respect to antenna 204 and receivers 212 and 220.

Receivers 210 and 212 for the first radio access technology are also in communication with summer 214. Summer 214 receives a signal from both receivers 210 and 212, and sums the signal to increase the gain of the received signal. Typically, summing the signals from receivers 210 and 212 at summer 214 can offset any loss in gain or signal strength that may result from the use of circulators 206 and 208 in the signal paths. In an embodiment, summer 214 can generate a summed signal with a signal strength which is higher than a signal strength of either of the signals of the first radio access technology received at antenna 202 or antenna 204.

Similarly, receivers 216 and 220 for the second radio access technology are also in communication with summer 222. Summer 222 receives a signal from both receivers 216 and 220, and sums the signal to increase the gain of the received signal. Typically, summing the signals from receivers 216 and 220 at summer 222 can offset any loss in gain or signal strength that may result from the use of circulators 216 and 220 in the signal paths. Additionally, summer 222 can generate a summed signal with a signal strength which is higher than a signal strength of either of the signals of the first radio access technology received at antenna 216 or antenna 220.

Wireless device 102 may also include other elements which are not illustrated for brevity, including memory to store data, a user interface to permit the receipt of an input from a user, a display to present information, an audio input/output device such as a microphone and/or speaker, and the like.

In an embodiment, a first signal of a first radio access technology is received at first antenna 202 and second antenna 204 of wireless device 102. First antenna 202 is in communication with a first circulator 206 and second antenna 204 is in communication with a second circulator 208. A second signal of a second radio access technology is received at first antenna 202 and second antenna 204 while receiving the first signal. The first signal received at first antenna 202 and the first signal received at second antenna 204 are combined to generate a combined first signal, and the second signal received at first antenna 202 and the second signal received at second antenna 204 are combined to generate a combined second signal. While receiving the first signal of the first radio access technology, a call request is received over the second signal of the second radio access technology.

Figure 3:
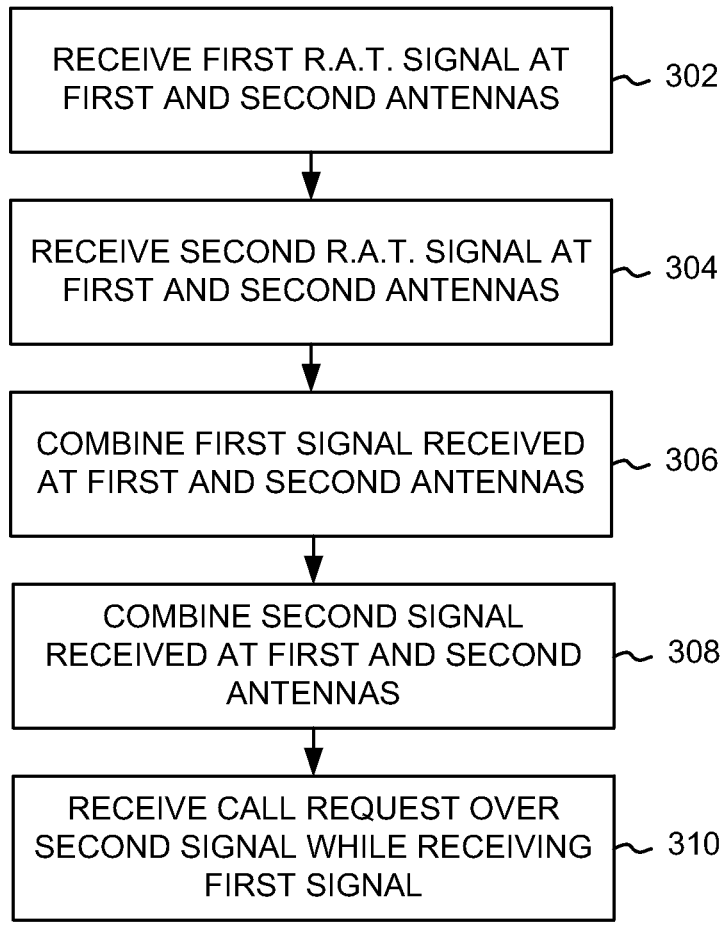
FIG. 3 illustrates an exemplary method of reducing latency in a wireless communication system.

FIG. 3 illustrates an exemplary method of reducing latency in a wireless communication system. In operation 302, a first signal of a first radio access technology is received at first and second antennas of a wireless device. For example, a first signal of a first radio access technology can be received at first antenna 202 and second antenna 204 of wireless device 102.

In operation 304, a second signal of a second radio access technology is received at the first and second antennas. For example, a second signal of a second radio access technology can be received at first antenna 202 and second antenna 204 of wireless device 102.

In operation 306, the first signal received at the first and second antennas is combined to generate a combined first signal. For example, the first signal can be received at antennas 202 and 204, and through circulators 206 and 208 can be received at receivers 210 and 212, respectively. Summer 214 can receive signals from receivers 210 and 212 and can combine the signals to generate a combined first signal. Thus, the first signal from the first circulator received at the first antenna, and the first signal from the second circulator received at the second antenna, can be combined at summer 214 to generate a combined first signal.

In operation 308, the second signal received at the first and second antennas is combined to generate a combined second signal. For example, the second signal can be received at antennas 202 and 204, and through circulators 206 and 208 can be received at receivers 216 and 220, respectively. Summer 222 can receive signals from receivers 216 and 220 and can combine the signals to generate a combined second signal. Thus, the second signal from the first circulator received at the first antenna, and the second signal from the second circulator received at the second antenna, can be combined at summer 214 to generate a combined second signal. In an embodiment, wireless device 102 can conduct a communication session using a first radio access technology and monitor the second radio access technology while conducting the communication session using the first radio access technology without switching either of antenna 202 or 204 to exclusively use the second radio access technology. In an embodiment, wireless device 102 can receive the first signal and the second signal substantially simultaneously. In an embodiment, wireless device 102 can receive the first signal and the second signal during a cycle of a circulator.

In operation 310, a call request is received over the second signal of the second radio access technology while receiving the first signal of the first radio access technology. For example, wireless device 102 can receive the first signal when a call request is received over the second signal at wireless device 102.

In an embodiment, the first radio access technology can be a data radio access technology, and the second radio access technology can be a push-to-talk radio access technology. In interconnect communication systems (involving two-way or duplex communication) performance requirements can tolerate call setup periods of several seconds. For push-to-talk communication systems (involving one-way or half-duplex communication), performance requirements require substantially shorter call setup periods. Wireless device 102 can be configured to conduct a communication session using the first radio access technology and monitoring the second radio access technology for a push-to-talk call request during the communication session. In an embodiment, the first signal and the second signal can be received during a single cycle of the first circulator and a single cycle of the second circulator.

In an embodiment, a push-to-talk call request can be received over the second signal of the second radio access technology while the first signal of the first radio access technology is received. For example, the first signal can use a first radio access technology (as one example, CDM2000 1xRTT) and the second signal can use a second radio access technology (as one example, CDMA2000 1xEV-DO). In an embodiment, while receiving the first signal using 1xRTT, wireless device 102 can receive a push-to-talk call request over the second signal using 1xEV-DO.

In wireless device 102, a gain of combined first signal will typically be higher than a gain of the first signal, and a gain of combined second signal will typically be higher than a gain of the second signal. Thus, in an embodiment, the combined first signal comprises a gain higher than that the first signal received at the first antenna or at the second antenna.

Figure 4:
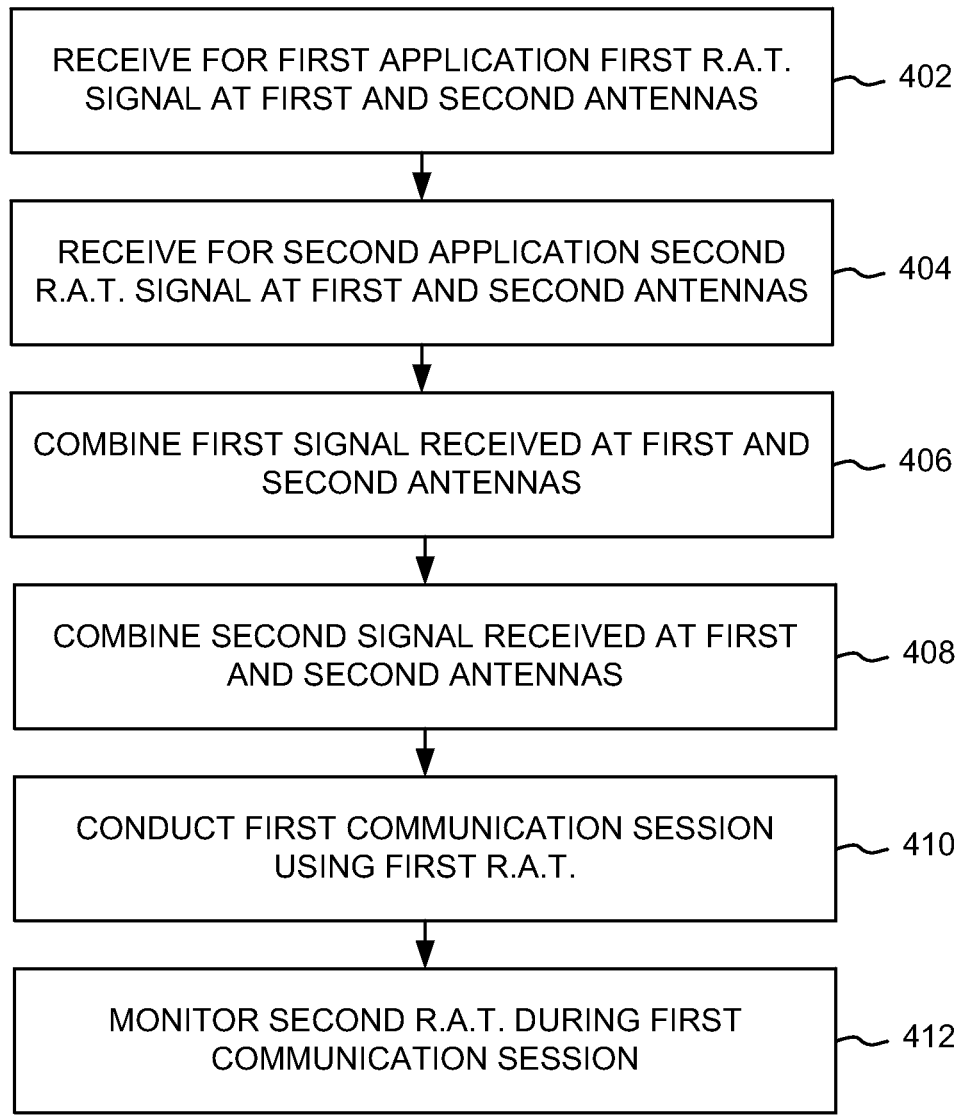
FIG. 4 illustrates another exemplary method of reducing latency in a wireless communication system.

FIG. 4 illustrates another exemplary method of reducing latency in a wireless communication system. In operation 402, a first signal is received at a first antenna and a second antenna for a first application using a first radio access technology. For example, a first signal using a first radio access technology can be received at first antenna 202 and second antenna 204 of wireless device 102 for a first application running on wireless device 102.

In operation 404, a second signal is received at the first and second antennas for a second application using a second radio access technology. For example, a second signal of a second radio access technology can be received at first antenna 202 and second antenna 204 for a second application running on wireless device 102. In an embodiment, the first signal and the second signal can be received substantially simultaneously.

In operation 406, a combined first signal is generated by combining from the first circulator the first signal received at the first antenna, and from the second circulator the first signal received at the second antenna. For example, the first signal can be received at antennas 202 and 204, and through circulators 206 and 208 can be received at receivers 210 and 212, respectively. Summer 214 can receive signals from receivers 210 and 212 and can combine the signals to generate a combined first signal. Thus, the first signal from the first circulator received at the first antenna, and the first signal from the second circulator received at the second antenna, can be combined at summer 214 to generate a combined first signal.

In operation 408, the second signal received at the first and second antennas is combined to generate a combined second signal. For example, the second signal can be received at antennas 202 and 204, and through circulators 206 and 208 can be received at receivers 216 and 220, respectively. Summer 222 can receive signals from receivers 216 and 220 and can combine the signals to generate a combined second signal. Thus, the second signal from the first circulator received at the first antenna, and the second signal from the second circulator received at the second antenna, can be combined at summer 214 to generate a combined second signal In an embodiment, wireless device 102 can conduct a communication session using a first radio access technology and monitor the second radio access technology while conducting the communication session using the first radio access technology without switching either of antenna 202 or 204 to exclusively use the second radio access technology.

The first communication session is conducted using the first application (operation 410), and the second radio access technology is monitored for a call request during the first communication session (operation 412). In an embodiment, the first signal and the second signal can be received substantially simultaneously, and thus the second radio access technology can be monitored while conducting a communication session using the first radio access technology.

As one example, a first application of a wireless device can be a streaming video application, and the second application can be a push-to-talk voice application. In an embodiment, using the streaming video application, wireless device 102 can receive data stream of a video using the first radio access technology, and while receiving the data stream wireless device 102 can monitor the second radio access technology for a call request for the push-to-talk voice application. The first application can be a latency sensitive application of wireless device 102. That is, the first application can have application requirements for a certain minimum data rate, or a maximum data delay, such that the performance of the first application meets a minimum performance threshold. The first application can be a streaming video, audio, or multimedia application, or it could be a voice application (such as Voice over Internet Protocol), and the like. Because wireless device 102 can monitor the second radio access technology while conducting a communication session using the first radio access technology, wireless device 102 can receive data for the first application to meet the performance threshold of the first application while monitoring the second signal using the second radio access technology.

Figure 5:
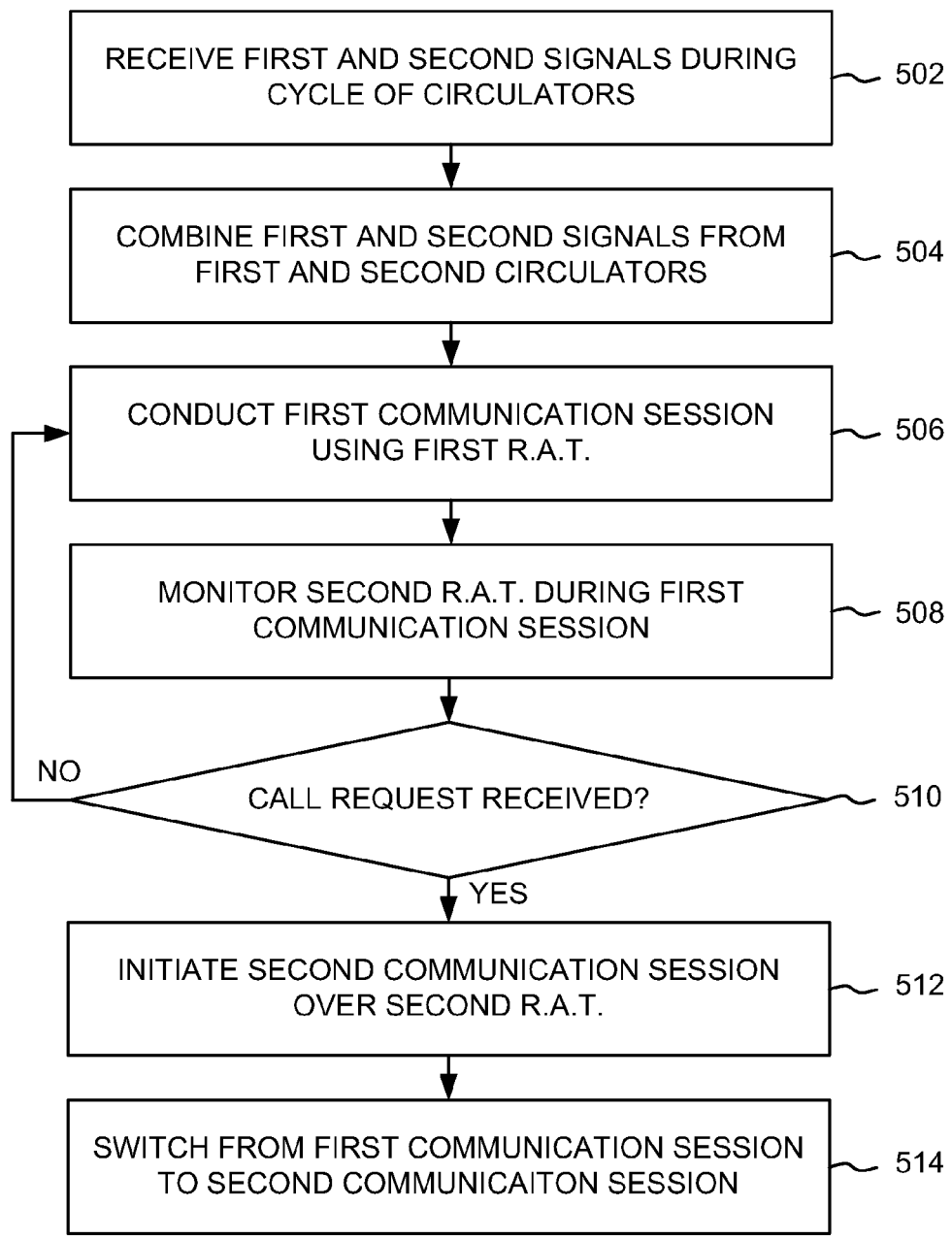
FIG. 5 illustrates another exemplary method of reducing latency in a wireless communication system.

FIG. 5 illustrates another exemplary method of reducing latency in a wireless communication system. In operation 502, a first signal using a first radio access technology and a second signal using a second radio access technology are received during a cycle of circulators of a wireless device. For example, the first signal and the second signal can be received at antennas 202 and 204 during a single cycle of circulators 206 and 208.

In operation 504, a combined first signal is generated by combining from the first circulator the first signal received at the first antenna, and from the second circulator the first signal received at the second antenna, and in addition the second signal received at the first and second antennas is combined to generate a combined second signal. For example, the first signal can be received at antennas 202 and 204, and through circulators 206 and 208 the first signal can be received at receivers 210 and 212, respectively. Similarly, the second signal can be received at antennas 202 and 204, and through circulators 206 and 208 the second signal can be received at receivers 216 and 220, respectively. Summer 214 can receive signals from receivers 210 and 212 and can combine the signals to generate a combined first signal, and summer 222 can receive signals from receivers 216 and 220 and can combine the signals to generate a combined second signal. In an embodiment, wireless device 102 can receive the first signal and the second signal substantially simultaneously.

The wireless device conducts a first communication session using the radio access technology (operation 506), and monitors the second radio access technology during the first communication session (operation 508). For example, wireless device 102 can conduct a communication session using a first radio access technology and monitor the second radio access technology while conducting the communication session using the first radio access technology without switching either of antenna 202 or 204 to exclusively use the second radio access technology. In an embodiment, the first communication session can be conducted using a first application and the second radio access technology can be monitored using a second application.

In operation 510, it is determined whether a call request is received at the wireless device on the second radio access technology. When no call request is received, (operation 510-NO), the first communication session is continued. When a call request is received (operation 510-YES), a second communication session is initiated using the second radio access technology (operation 512). Once initiated, the wireless device switches from the first communication session to the second communication session (operation 514).

For example, wireless device 102 can receive a call request at a second application while conducting a first communication session using a first application. In an embodiment, the first application can be a streaming audio application and the second application can be a push-to-talk voice application. Based on the received call request wireless device 102 can also initiate a second communication session with the second application based on the received call request. Similarly, wireless device 102 can switch from the first communication session with the first application to the second communication session with the second application (and vice versa), while maintaining both the first and the second communication sessions.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of reducing latency in a wireless communication system, comprising:
   receiving a first signal of a first radio access technology at a first antenna and a second antenna of a wireless device, wherein the first antenna is in communication with a first circulator and the second antenna is in communication with a second circulator;
   receiving a second signal of a second radio access technology at the first antenna and the second antenna of the wireless device while receiving the first signal;
   combining from the first circulator the first signal received at the first antenna, and from the second circulator the first signal received at the second antenna, to generate a combined first signal;
   combining from the first circulator the second signal received at the first antenna, and from the second circulator the second signal received at the second antenna, to generate a combined second signal; and
   receiving a call request over the second signal of the second radio access technology while receiving the first signal of the first radio access technology.

2. The method of claim 1, further comprising:
   conducting a communication session using the first radio access technology and monitoring the second radio access technology for a push-to-talk call request during the communication session.

3. The method of claim 1, wherein receiving a second signal of a second radio access technology at the first antenna and the second antenna of the wireless device while receiving the first signal further comprises:
   receiving the first signal and the second signal during a single cycle of the first circulator and a single cycle of the second circulator.

4. The method of claim 1, wherein receiving a call request over the second signal of the second radio access technology while receiving the first signal of the first radio access technology further comprises:
   receiving a push-to-talk call request over the second signal of the second radio access technology while receiving the first signal of the first radio access technology.

5. The method of claim 1, wherein the combined first signal comprises a gain higher than the first signal received at the first antenna or at the second antenna.

6. The method of claim 1, wherein the combined second signal comprises a gain higher than the second signal received at the first antenna or at the second antenna.

7. A method of dual signal reception, comprising:
   receiving for a first application running on a wireless device a first signal of a first radio access technology at a first antenna and a second antenna of the wireless device, wherein the first antenna is in communication with a first circulator and the second antenna is in communication with a second circulator;
   receiving for a second application running on the wireless device a second signal of a second radio access technology at the first antenna and the second antenna of the wireless device;
   combining from the first circulator the first signal received at the first antenna, and from the second circulator the first signal received at the second antenna, to generate a combined first signal for the first application;
   combining from the first circulator the second signal received at the first antenna, and from the second circulator the second signal received at the second antenna, to generate a combined second signal for the second application; and conducting a first communication session using the first application and monitoring with the second application the second radio access technology for a call request during the first communication session.

8. The method of claim 7, further comprising:
receiving a call request at the second application while conducting the first communication session using the first application.

9. The method of claim 8, further comprising:
initiating a second communication session with the second application based on the received call request.

10. The method of claim 9, further comprising:
switching from the first communication session to the second communication session.

11. The method of claim 7, wherein conducting a first communication session using the application and monitoring with the second application the second radio access technology for a call request during the first communication session further comprises:

conducting a first communication session using the application and monitoring with the second application the second radio access technology for a push-to-talk call request during the first communication session.

12. The method of claim 7, wherein the combined first signal comprises a gain higher than that the first signal received at the first antenna or at the second antenna.

13. The method of claim 7, wherein the combined second signal comprises a gain higher than that the second signal received at the first antenna or at the second antenna.

14. A wireless device for reducing latency in a wireless communication system, comprising:
a first antenna and a second antenna, each to receive a first signal and a second signal;
a first circulator in communication with the first antenna;
a second circulator in communication with the second antenna;
a processor configured to
combine from the first circulator the first signal received at the first antenna, and from the second circulator the first signal received at the second antenna, to generate a combined first signal,
combine from the first circulator the second signal received at the first antenna, and from the second circulator the second signal received at the second antenna, to generate a combined second signal, and
receive a call request over the second signal of the second radio access technology while receiving the first signal of the first radio access technology.

15. The wireless device of claim 14, wherein the processor is further configured to:
to run a first application to conduct a communication session over the first radio access technology and a second application to run a second communication session over the second radio access technology.

16. The wireless device of claim 14, wherein the processor is further configured to:
conduct a communication session using the first radio access technology and monitoring the second radio access technology for a push-to-talk call request during the communication session.

17. The wireless device of claim 14, wherein the first signal and the second signal are received during a single cycle of the first circulator and a single cycle of the second circulator.

18. The wireless device of claim 14, wherein the processor is further configured to:
receive a push-to-talk call request over the second signal of the second radio access technology while receiving the first signal of the first radio access technology.

19. The wireless device of claim 14, wherein the combined first signal comprises a gain higher than the first signal received at the first antenna or at the second antenna.

20. The wireless device of claim 14, wherein the combined second signal comprises a gain higher than the second signal received at the first antenna or at the second antenna.

* * * * *